United States Patent [19]

Pietrobelli

[11] 4,417,505

[45] Nov. 29, 1983

[54] POP CORN PREPARING AND DISPENSING MACHINE

[76] Inventor: Silvio Pietrobelli, Via Firenze 9, Schio (Vicenza), Italy

[21] Appl. No.: 297,463

[22] Filed: Aug. 28, 1981

[30] Foreign Application Priority Data

Apr. 6, 1979 [IT] Italy .................. 41550 A/79

[51] Int. Cl.³ .............................................. H23L 1/18
[52] U.S. Cl. .................................. 99/323.6; 99/323.7; 99/323.8; 99/323.9
[58] Field of Search .............. 99/323.5, 323.6, 323.7, 99/323.8, 323.9, 323.11, 356, 323.4, 472, 476, 477, 467

[56] References Cited

U.S. PATENT DOCUMENTS

| 1,206,693 | 11/1916 | Gillitt | 99/323.11 |
| 2,421,902 | 6/1947 | Neuschotz | 99/323.5 |
| 3,323,440 | 6/1967 | Grant | 99/323.5 |
| 3,512,989 | 5/1970 | Smith | 99/323.8 |
| 4,152,974 | 5/1979 | Tienor | 99/323.9 |
| 4,307,657 | 12/1981 | Avery | 99/323.7 |

Primary Examiner—Robert W. Jenkins
Attorney, Agent, or Firm—Sheridan Neimark; Karl W. Flocks

[57] ABSTRACT

An automatic machine for preparing pop corn comprises a vertical shaft (17a) the bottom of which is closed by a rotary grid (3) beneath which an electric resistor (7) is provided for causing the corn kernels contained in the shaft (18a) to be popped by exposure to dry heat: the popped kernels are collected by suction along a horizontal extension (18b) of the vertical shaft (18a) and discharged into no return bags or similar containers (25). The operative sequence of the machine is appropriately automatized in order to dispense the cooked product shortly after cooking and whenever requested by the consumers.

11 Claims, 6 Drawing Figures

POP CORN PREPARING AND DISPENSING MACHINE

This invention relates to an automatic machine for preparing and dispensing pop corn.

As is known, pop corn is prepared by placing corn kernels on a hot plate; after a certain time, due to the effect of heating and the internal moisture of the spongy mass of the kernel, the kernel is puffed out and originates a lightweight and tasty blob.

Usually, in order to prevent the seeds from sticking to the hot plate of the cooking vessel, an oil film is spread on the plate but this, however, alters the characteristics of the product somewhat.

The product has a wide acceptance and, for being dispensed, it is usually packed in bags and the product is sold and eaten even many days as from its preparation. Also for this reason the presence of a small amount of oil is necessary for keeping the product soft.

It is obvious, however, that this kind of preparation and dispensing is not ideal a one for the quality of the product which arrives at the consumer's hands.

The principal object of the present invention is to provide an automatic machine for the preparation and dispensing of pop-corn which offsets the shortcomings experienced with the conventional procedure.

Still another object is to provide a machine which automatically prepares the product in such a way that not too long a time elapses between the preparation and the consumption.

Yet another object is to dispense with any additive whatsoever in the preparation of the product.

Last, but not least, object is to provide a machine which is simple, relieable, having a low running cost and which virtually does not require any upkeep.

The foregoing objects with other which will become more clearly apparent hereinafter, are achieved by an automatic machine for preparing and dispensing pop corn, the machine comprising a cooking chamber whereinto a metered amount of kernels is fed, said chamber being closed at its bottom by a movable grid below which a heating resistor is located, said chamber being connected at its top to a product-withdrawal conduit, an exhauster carrying the ready cooked product to a temporary storage tank capable of subsequently metering the product to be dispensed, metered salting means for the product as it is being dispensed, control means for sensing the start of the cooking step and energizing the exhauster, means for stopping the intake of kernels to the cooking chamber as the storage tank is full, means for cleaning the cooking grid and means for delivering a no-return bag for the ready cooked product.

Further characteristics and advantages of the invention will become clearer from the ensuing detailed description of a preferred embodiment of the invention given by indication and without any exclusion or limitation, as illustrated in the accompanying drawings, wherein.

Having now reference to the Figures of the drawings, the machine comprises a cooking chamber 1 having a substantially cylindrical configuration with a vertical axis, the bottom base being slanted along a plane inclined relative to the horizontal line to form an open mouth. Said open mouth is closed by a mesh 2 which is a portion of a disc 3 having a diameter much larger than the base surface of the cooking chamber 1.

Figure 2:
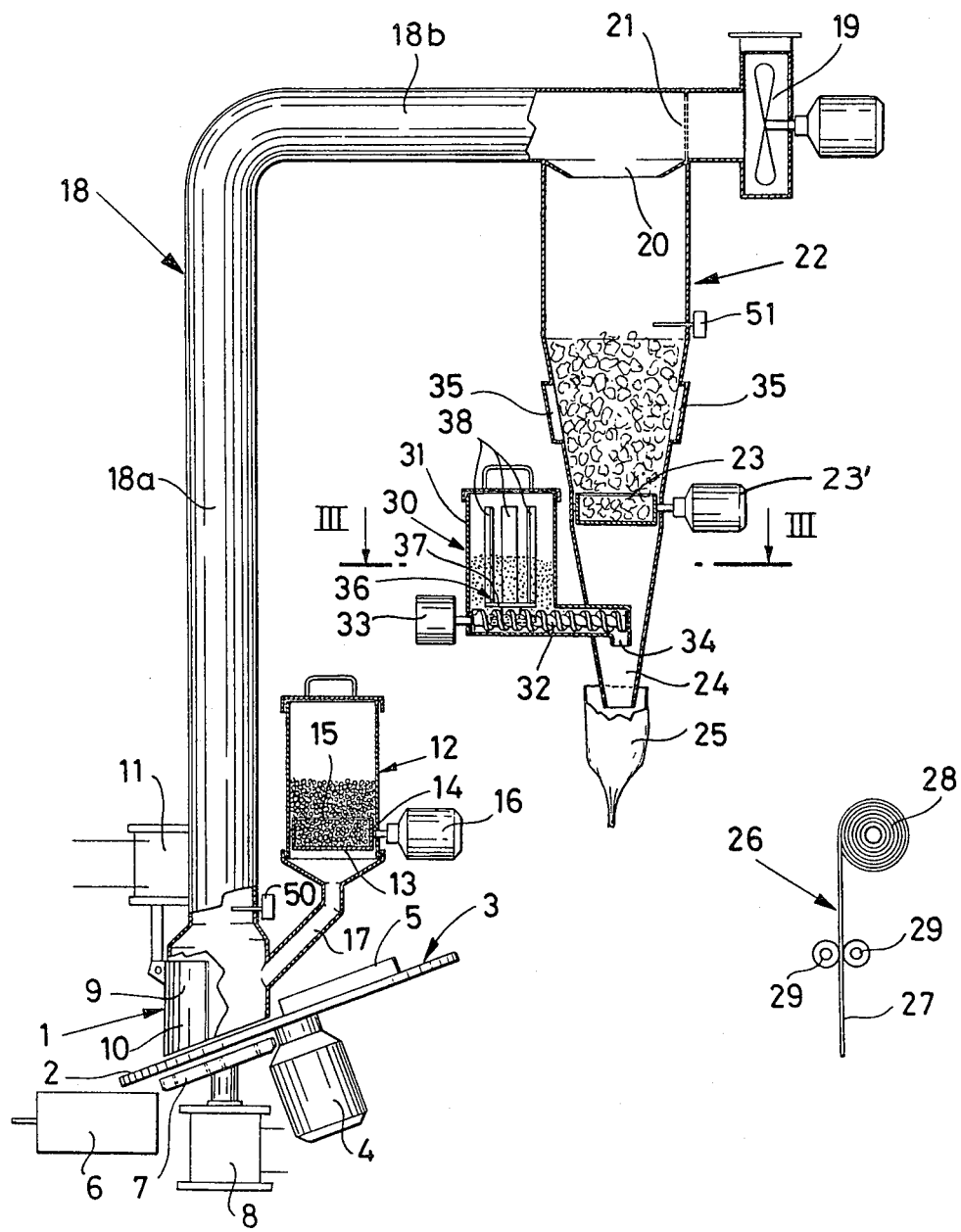
FIG. 2 is a vertical cross-sectional view of the machine.
Figure 3:
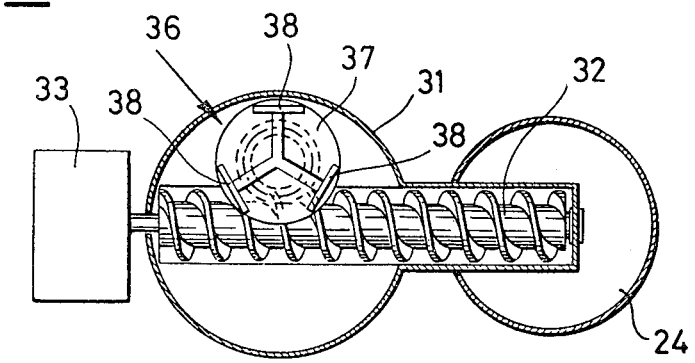
FIG. 3 is a horizontal cross-sectional view, taken along the line III—III of FIG. 2.

The disc 3, made with a stainless steel gauze 2, is driven to rotation by an electric motor 4 (best seen FIG. 2).

By so doing, the portion of the gauze 2 which closes the cooking chamber 1, is movable so that it effects, on the one hand, the even blending of the product held in the cooking chamber 1, and, on the other hand, the replacement of the portion of gauze which closes the chamber 1, the gauze 2 being scraped, once it is clear of the bottom of the chamber 1, by a radial blade 5 which unsticks the product which possibly stuck to the gauze and conveys it, by virtue of the slope of the disc 3, to a scrap collecting bin 6.

Beneath the gauze 2 there is an electric resistor 7 which is maintained, during cooking, very close to the gauze 2, and is borne by the movable core of an electromagnet 8, energized in parallel with the resistor itself.

The provision of the electromagnet 9 for supporting the electric resistor 7 is appropriate for a number of reasons.

In the first place, on completion of each individual cooking step of a dose of the product in the chamber 1, the cooked product stays for a certain time in the chamber prior to being withdrawn so as to attain its top fragrance. During this period of time, the resistor 7 is de-energized and withdrawn from the closing gauze 2 so as to prevent overheating of the product lying in the chamber.

Secondly, on completion of a plural cooking cycle, as the disc 3 is stopped and the resistor 7 is de-energized, it is imperative to prevent the gauze 2 from being locally overheated during too long a time by the thermal inertia of the resistor 7, so as to prevent the permanent deformation of the gauze.

The cooking chamber 1 has, in correspondence with the lowermost section of the cylindrical surface close to the bottom edge a discharge port 9 closed by a cylindrical lap door 10 which is adapted to open or close the port 9 by being vertically shifted under control of an electromagnet 11 to discharge, after every individual cooking step of a dosage unit of the product, the scraps present in the chamber 1: these latter, by virtue of the slope of the disc 3, are dropped into the scrap collecting bin 6.

Figure 1:
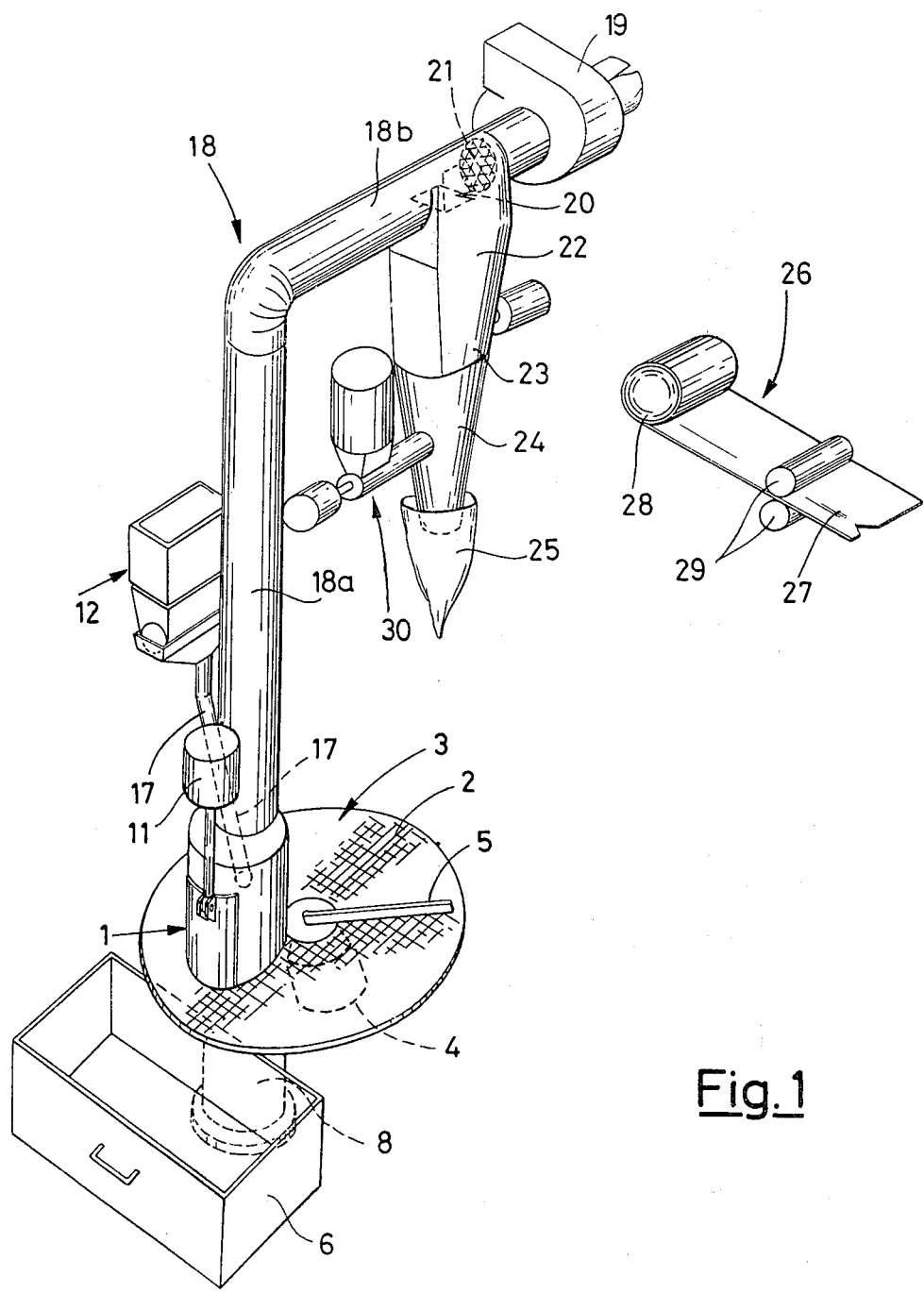
FIG. 1 is an overall perspective view of the component parts of the machine.

The corn seeds to be cooked are held in a hopper-like container 12 having a mechanical metering device 13 composed of a horizontal-axis cylindrical vessel 14 having a side opening 15 confined by two parallel generating lines: when this opening is oriented upwards (FIG. 4), it confronts the discharge area of the hopper-like container 12 and is filled by the corn seeds which drop thereinto. Whenever it is desired to convey corn seeds into the cooking chamber 1, an electric motor 16 causes the cylindrical container 14 to be slowly rotated through 360° about its axis so as to orient the side opening 15 downwards (FIG. 5) so that the product is discharged into a conveyor 17 (FIG. 1) which forwards it into the cooking chamber 1. The motor 16, advantageously, is coupled to a reducing gear and conventional means, not shown in the drawings, cause the cylindrical container 14 of the metering unit to be rotated through a single revolution only, whereafter it is brought back each time to the same position with the opening 15 pointing upwards, that is, confronting the hopper-like container 12.

It should be noted that this metering unit 13, in its inoperative position, is always in its configuration of start of the metering step and, even in the case of failure of the electric energization of the machine, no matter in what position the cylindrical container 14 has been stopped, it will return to its correct position as electricity comes back into the mains again.

Also for the electric resistor 7 for heating, if current failure occurs, the electromagnet 8 is de-energized and the resistor is withdrawn from the gauze 2, so that damages due to overheating of the gauze and the product possibly lying in the chamber 1 are efficiently prevented.

In the top portion, the chamber 1 is extended by a suction pipe 18, through which, by means of an air stream produced by an exhauster 19, the cooked product is withdrawn.

The tube 18 in question is composed of a first vertical section 18a having an appropriate length, which is continued by a horizontal section 18b, the latter being terminated where the exhauster vanes 19 are located. In the horizontal section 18b aforementioned, there is an opening 20 which points downwards and, immediately downstream thereof, that is proceeding towards the exhauster 19, there is a gauze screen 21.

The sucked product thus goes along the tube 18 first horizontally and then vertically, whereafter it drops through the opening 20: a portion of the product will remain, due to the effect of air suction, sticking to the screen 21 but it will also drop into the opening 20 as soon as the exhauster 19, the operation of which is intermittent, is stopped.

Beneath the opening 20 there is a collection bin 22 for containing an appropriate number of unit doses of the product. The bin 22 is equipped, with advantage, with heating means 35, for example an electric resistor.

Figure 4:
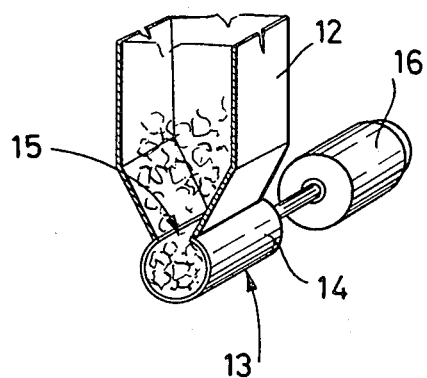
FIGS. 4 and 5 show diagrammatically the configuration of the product dispensers which are an integral part of the machine.
Figure 5:
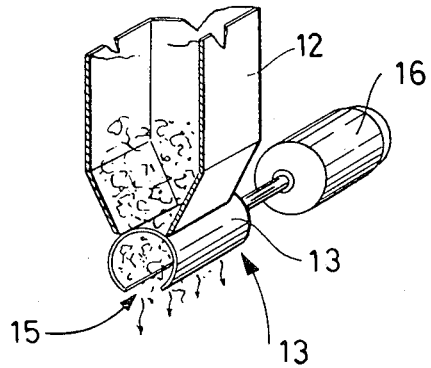

At the base of the bin 22 there is a hopper with a metering unit 23, operated by motor 23', for the product, entirely similar to that which has already been described and illustrated in connection with FIGS. 4 and 5, and which is terminated by a conveying funnel 24 where the consumer, after having positioned a paper bag 25, collects the product dispensed by the machine.

The paper bag 25 can be delivered by a bag dispensing unit 26 causes a portion 27 of paper tube to go forward, the consumer then providing to flare out at either end and twists at the other end so as to form a no-return bag for the product.

The paper tube is wrapped about a reel 28 and is caused to go ahead stepwise by a couple of motorized rollers 29. Salting means, 30, are provided for the dosage unit of product as dispensed by the machine. These means are composed of a substantially cylindrical container 31 into which a certain quantity of salt is poured, which is sufficient for salting a number of dosage units of the dispensed product.

At the base of the container 31 there is a worm 32 driven by an electric motor 33: the latter, in its motion, draws a certain preselected amount of salt which, dropped through an opening 34, is introduced into the conveying funnel 24.

To prevent that the environmental moisture might originate within the container 31 salt bridges or lumps which would hamper the dispensing of the salt, there is an anticaking device 36 which is composed of a disc 37 having an axis perpendicular but not coplanar with the axis of the worm 32, said disc being associated to a gear meshing with the spirals of the worm 32 like a worm-and-wormwheel mechanism.

At every period of time of rotation of the worm 32, the disc 37 is concurrently rotated, to which three spokes 38 are perpendicularly secured: these, immersed as they are in the salt mass, mix and remix the salt.

The machine in question is completed by an assembly for sequentially controlling the preparation and the dispensing of the product.

In practice, a photoelectric cell device 50 (FIG. 2) is provided, which, located in the top section of the cooking chamber 1, is actuated by the product intersecting the light beam as the kernels are popped up. The photoelectric cell device 50 energizes the exhauster 19 in the manner to be described in more detail hereinafter.

The bin 22; to which the ready cooked product is conveyed, is equipped with a level detector 51, preferably of the photoelectric cell type, which stops the cooking cycles of the product as the reservoir 12 is full.

The photoelectric cell device 50 and the level detector 51 can be replaced, if desired, by equivalent mechanical devices.

Figure 6:
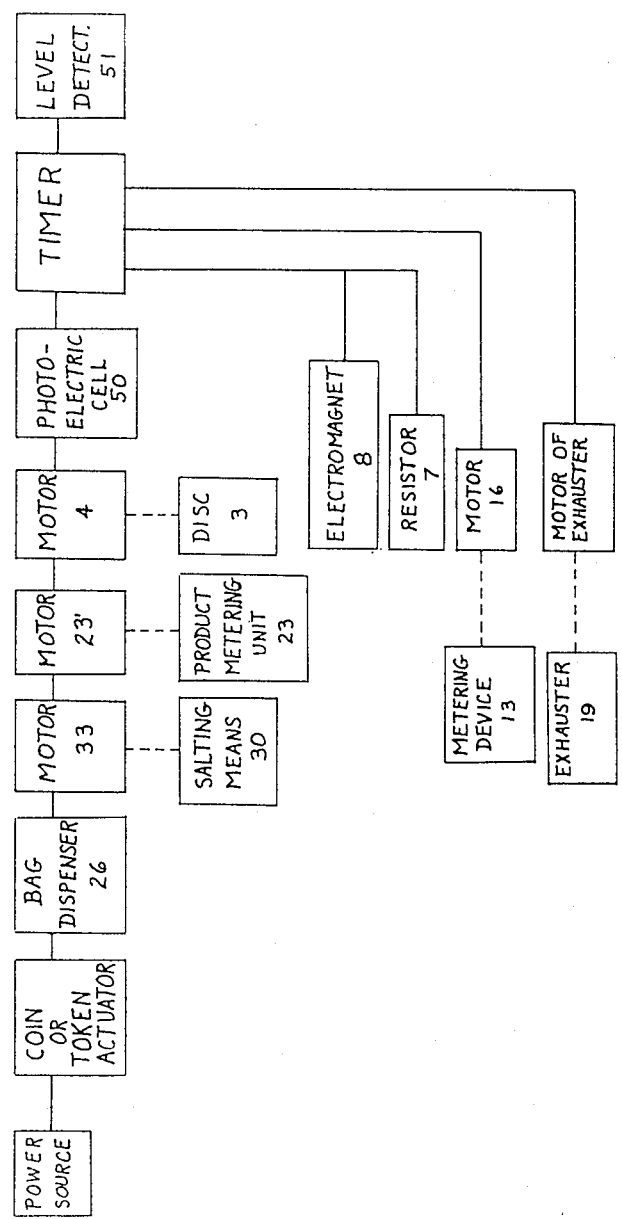
FIG. 6 is a block diagram of the control circuitry of the machine of the present invention.

The operation of the machine illustrated in block diagram form in FIG. 6 is as follows.

As a cooking cycle is to be started, the disc 3, at the outset, is driven to rotation by the motor 4, whereafter both the electromagnet 8 and the electric resistor 7 are energized, so that the resistor can approach the gauze 2 and starts to be heated, whereupon a certain preselected amout of kernels is introduced in the cooking chamber 1 from the kernel container by the first metering unit 13.

After a certain time, due to the effect of the heat produced by the resistor 7, the kernels begin to be puffed out and popped up.

As one of these kernels, in its upward motion intersects the light beam of the photoelectric cell device 50, the latter energizes a timer, which, after a preselected first time interval, de-energizes both the electric resistor 7 and the electromagnet 8, and, after a second preselected time interval, energizes the exhauster 19, the latter removes from the chamber 1 the entire content of ready cooked product, which is extremely lightweight and conveys it towards the bin 22.

The exhauster 19, driven for a preselected time by a time switch which stops it after a preselected time interval, is active for such a time interval as to be sure that the entire dosage unit of pop corn held in the chamber 1 has been withdrawn therefrom and conveyed into the bin 22. Once the exhauster 19 is stopped, the cycle is repeated with a fresh dosage unit of product charged in the cooking chamber 1 and the sequence of these steps goes on until the level detector 51 in the bin 22 indicates that the bin is full and contains a preselected number of dosage units, whereupon the machine is stopped by the detector 51.

The disc 3, a gauze portion 2 of which is the bottom wall of the cooking chamber 1, is rotated about its axis continuously and, on completion of each individual cycle, the residual scraps are dumped.

By so doing, as will be noted, the product is prepared shortly before its use and without employing any oil or fat or any other cooking additives.

The short time lag during which the product remains stationary within the bin 22, not only does not damage the product but, conversely, improves its characteristics, inasmuch as it is well known that quality optimization requires that a certain time elapses between the preparation and the consumption.

The machine described hereinabove can be embodied in the form of a dispensing machine actuated by a token or a coin, and, if so, the introduction of a token or a coin causes the previous dispensing of a bag 25 and the actuation of the product metering unit 23 together with the energization of the salting unit 30.

The means which make possible the automatic operation of the machine have been described only in an indicative manner, it being understood that such means can easily be envisaged by anyone skilled in the art on the basis of the conventional teachings. After the withdrawal of a dosage unit of product from the bin 22, the machine is automatically restarted to restore the product level in said bin.

I claim:

1. An automatic machine for producing and dispensing pop corn, comprising a cooking chamber, first metering means for feeding said chamber with a metered amount of corn kernels, a movable grid adapted to close said cooking chamber at the bottom, a heating resistor arranged beneath said grid, a conduit for withdrawing the ready cooked product connected at its top to said cooking chamber and opening into a temporary storage bin for the cooked product, an exhauster adapted to produce in said conduit an air stream directed towards said bin from said chamber, second metering means at the outlet of said bin for dispensing dosage units of the cooked product, salting means for salting the product as it is being dispensed, means for checking the start of cooking and consequentially actuating said exhauster, means for stopping the metered feed of corn seeds to the cooking chamber as said temporary storage bin has been filled, grid-cleaning means, and means for dispensing a no-return bag for receiving the ready cooked product as distributed by said second metering means.

2. Machine according to claim 1, wherein said cooking chamber is substantially cylindrical with a vertical axis and both bases open, the bottom base being slanting relative to the horizontal line, there being provided in the lowermost location of the cylindrical surface an opening with a movable door, means being provided to open said door on completion of each individual cooking cycle of a single dosage unit of product so as to dump scraps.

3. Machine according to claim 1, wherein said grid closing the bottom base of said cooking chamber is a portion of a gauze disc, means being provided for rotating said disc about the axis thereof so as continuously to renew the closing grid surface beneath said chamber so as to remix the product contained therein and to prevent its sticking.

4. Machine according to claim 1, wherein said electric resistor arranged beneath said grid is supported by the movable core of an electromagnet, which, whenever it is energized during the cooking step, holds said electric resistor close to said grid.

5. Machine according to claim 4 wherein said resistor and said electromagnet are connected in parallel with respect to one another.

6. Machine according to claim 1, wherein said withdrawal conduit has a vertical portion followed by a horizontal shank, the latter being terminated at the mouth of said exhauster, said mouth being shielded by a gauze screen which stops the airborne product, said horizontal shank having an opening immediately upstream of said gauze screen to which said temporary storage bin is connected.

7. Machine according to claim 1, wherein said second metering means located at the outlet of said temporary storage bin can be actuated by the introduction of a coin or a token into a token-colleting box, to discharge through an opening a preselected amount of product into a no-return bag.

8. Machine according to claim 1, wherein said salting means consist of a hopper-like container which contains dry salt and has its bottom a worm adapted to draw a preselected amount of dry salt.

9. Machine according to claim 1, wherein said means for checking the start of the cooking step consist of a photoelectric cell device arranged in the top section of the cooking chamber, said device being adapted to actuate said exhauster by a timer for a preselected time.

10. Machine according to claim 1, wherein a level detector is provided within said temporary storage bin for stopping the sequential cooking cycles of metered amounts of product as said bin is filled with cooked product.

11. Machine according to claim 1, wherein said means for cleaning said grid consist of a scraping blade arranged radially and externally relative to said cooking chamber.

* * * * *